United States Patent [19]

Fujino et al.

[11] 4,214,245
[45] Jul. 22, 1980

[54] LORAN RECEIVING APPARATUS

[75] Inventors: Teruhisa Fujino, Kawasaki; Fujio Osawa, Tama; Noriaki Nagao, Toshima; Shigeo Hanji, Musashino, all of Japan

[73] Assignee: Kabushiki Kaisha Koden Seisakusho, Tokyo, Japan

[21] Appl. No.: 944,522

[22] Filed: Sep. 20, 1978

[30] Foreign Application Priority Data

Sep. 26, 1977 [JP] Japan .................................. 52-114763
Nov. 9, 1977 [JP] Japan ............................ 52-150204[U]

[51] Int. Cl.$^2$ ............................................... G01S 1/24
[52] U.S. Cl. ..................................................... 343/103
[58] Field of Search .......................................... 343/103

[56] References Cited

U.S. PATENT DOCUMENTS

| 3,263,231 | 7/1966 | Smith et al. ..................... 343/103 X |
| 3,806,933 | 4/1974 | De Vaul ................................. 343/103 |
| 3,868,691 | 2/1975 | Miller et al. .......................... 343/103 |

Primary Examiner—T. H. Tubbesing
Attorney, Agent, or Firm—Pollock, Vande Sande and Priddy

[57] ABSTRACT

A Loran receiving apparatus is repeatedly switched by the actuation of a display mode changeover means between the state of displaying a plurality of measured time differences on a display in a sequential order and the state of continuously displaying only one of the measured time differences. A Loran signal detector detects a phase code of an incoming Loran signal. The detected phase code is stored in N memory parts, each corresponding to the Loran signal repetition period. Coincidence of the outputs from the memory parts is detected as the presence of a correct Loran signal.

13 Claims, 7 Drawing Figures

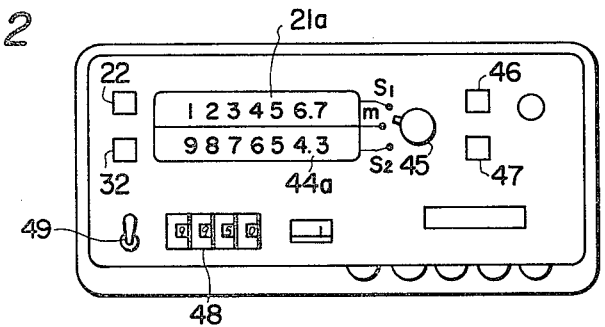
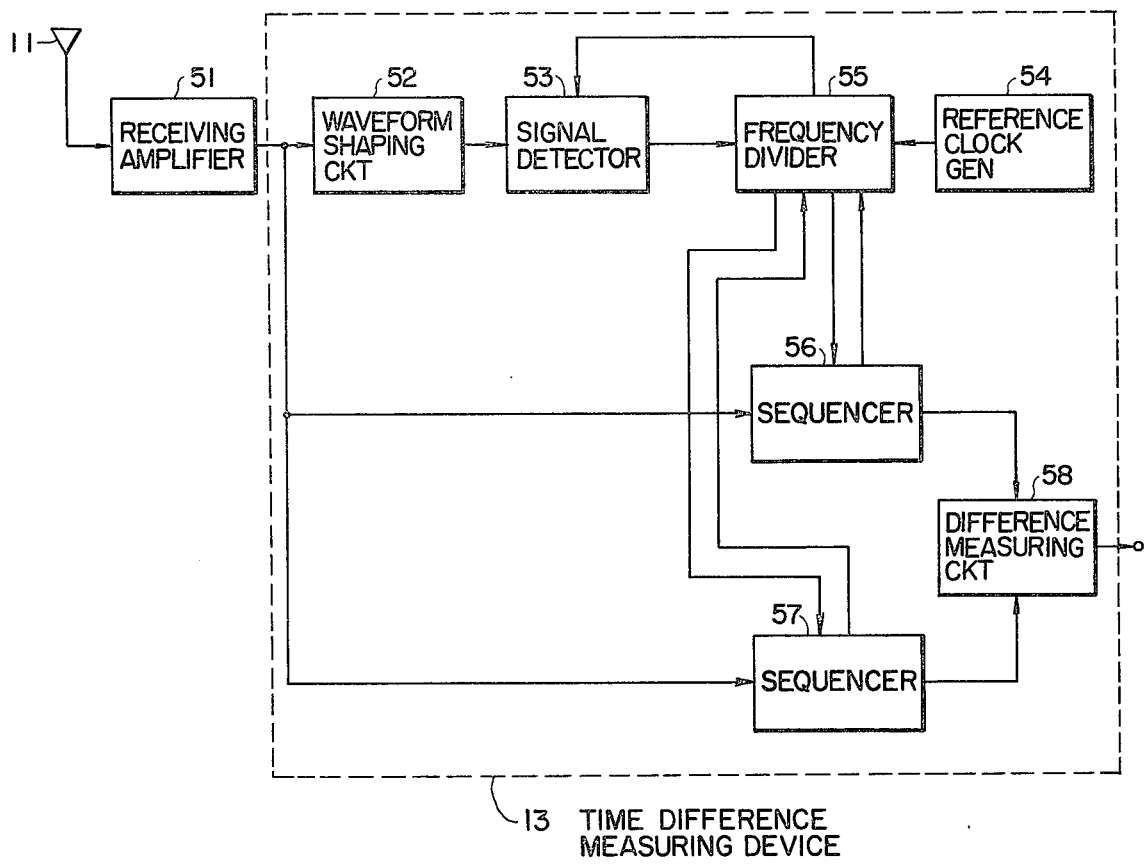

LORAN RECEIVING APPARATUS

BACKGROUND OF THE INVENTION

This invention relates to a Loran receiver which receives pulse signals transmitted from a master and a slave station and measures the time difference in arrival between both pulse signals.

In a Loran receiver, the time difference in arrival between pulse signals from a pair of master and slave stations is measured to determine one position line on which the Loran receiver is positioned, and the time difference between pulse signals from another pair of master and slave stations is measured to determine another position line, and then the intersection of the two position lines is read out from a Loran chart, thereby locating the position of the Loran receiver. For such localization, it is necessary to measure two time differences between pulse signals from at least two pairs of master and slave stations, as referred to above. In the prior art, measured time differences between pulse signals from each of a plurality of pairs of master and slave stations, which are obtained in a Loran receiver, are sequentially displayed on one display while being manually switched by an operator, and the two most suitable ones of the measured time differences for positioning purposes are selected and displayed alternately with each other, and based on the displayed values, a Loran chart is read out. This conventional method involves such manual selection of the suitable measured time differences, and hence is inevitably complicated in operation.

In Loran C or D, a group of pulses are repeatedly transmitted, and the presence or absence of an inverted carrier phase between adjacent ones of the pulses in the pulse group is encoded to indicate from which station the pulses are transmitted. A receiver of Loran C or D, decides the phase code of the received pulse group to select a desired Loran pulse. In some cases, however, a faulty phase code may be produced by noises or like components, resulting in a pseudo-Loran signal being detected. To avoid this, it is the practice in the prior art to detect a desired Loran signal a plurality of times in succession, produce a measurement pulse synchronized with the Loran signal and employ it for measurement of the time difference. Hence, in the prior art, upon detection of a desired phase code, it is assumed to be a correct signal, on the basis of which sample pulses of a Loran repetitive period are developed, and a plurality of successive sample pulses are each checked for the detection of a phase code. If it is not detected, the same operation is carried out based on a phase code obtained after the abovesaid plurality of sample pulses, and this operation is repeated until phase codes are detected respectively in coincidence with a plurality of sample pulses. Such a conventional method has the drawback that the detection of a correct Loran signal requires as long a time as 20 to 60 seconds or more in dependence on the SN ratio of the received signal.

An object of this invention is to provide a Loran receiver which permits a marked simplification of the operation for selecting desired measured time differences.

Another object of this invention is to provide a Loran receiver which ensures detection of a correct Loran signal within a short time without seizing a pseudo-signal.

Still another object of this invention is to provide a Loran receiver which is very simple in operation for selective display of measured time differences and ensures the detection of a correct Loran signal in a short time.

SUMMARY OF THE INVENTION

According to this invention, the Loran receiver is switched to first and second display modes alternately with each other by manual control of display mode switching means. In the first display mode, time difference signals, each measured in connection with one of a different pair of a master station and slave stations, which are respectively provided at a plurality of measured output terminals of the Loran receiver, are supplied to a display one after another in the order of frequency. In the second display mode, the time difference signal is continuously supplied to the display from the measured output terminal at which is derived the time difference signal supplied to the display in the first display mode immediately before the Loran receiver is altered therefrom to the second display mode.

Accordingly, once the display mode switching means has been set in the first display mode, the time differences for the respective pairs of master and slave stations are automatically displayed one after another, and by manually switching the first display mode to the second one upon displaying a time difference suitable for localization, this time difference is continuously displayed. Two such mode switching means are provided for producing displays on individual displays respectively corresponding to the two switching means, by which it is possible to easily select two pairs of preferred time difference signals and continuously display them on the two displays.

The carrier of the received Loran signal is rendered into a square wave for input to a phase code detector, in which the received signal is detected to be the phase code of a desired Loran signal. The output from the phase code detector is stored in a storage unit comprising N memory parts (N being an integer larger than 1) substantially in succession for N repetitive periods of the Loran signal. The data stored in the N memory parts are supplied to a coincidence detector which produces an output only when all of the outputs from the memory parts are obtained at the same time.

With such arrangement, it is continuously checked whether or not in the successive N periods phase codes are simultaneously detected in the memory parts corresponding to the respective periods; therefore, a correct Loran signal can be detected when the N periods of the Loran signal have passed after starting of the Loran receiver, thus permitting measurement in a short time.

BRIEF DESCRIPTION OF THE DRAWINGS

FIG. 2 is a schematic diagram showing an example of the front panel of the Loran receiver depicted in FIG. 1;

FIG. 4 is a block diagram showing the general construction of the time difference measuring devices of the Loran receiver of FIG. 1;

DESCRIPTION OF THE PREFERRED EMBODIMENTS

Figure 1:
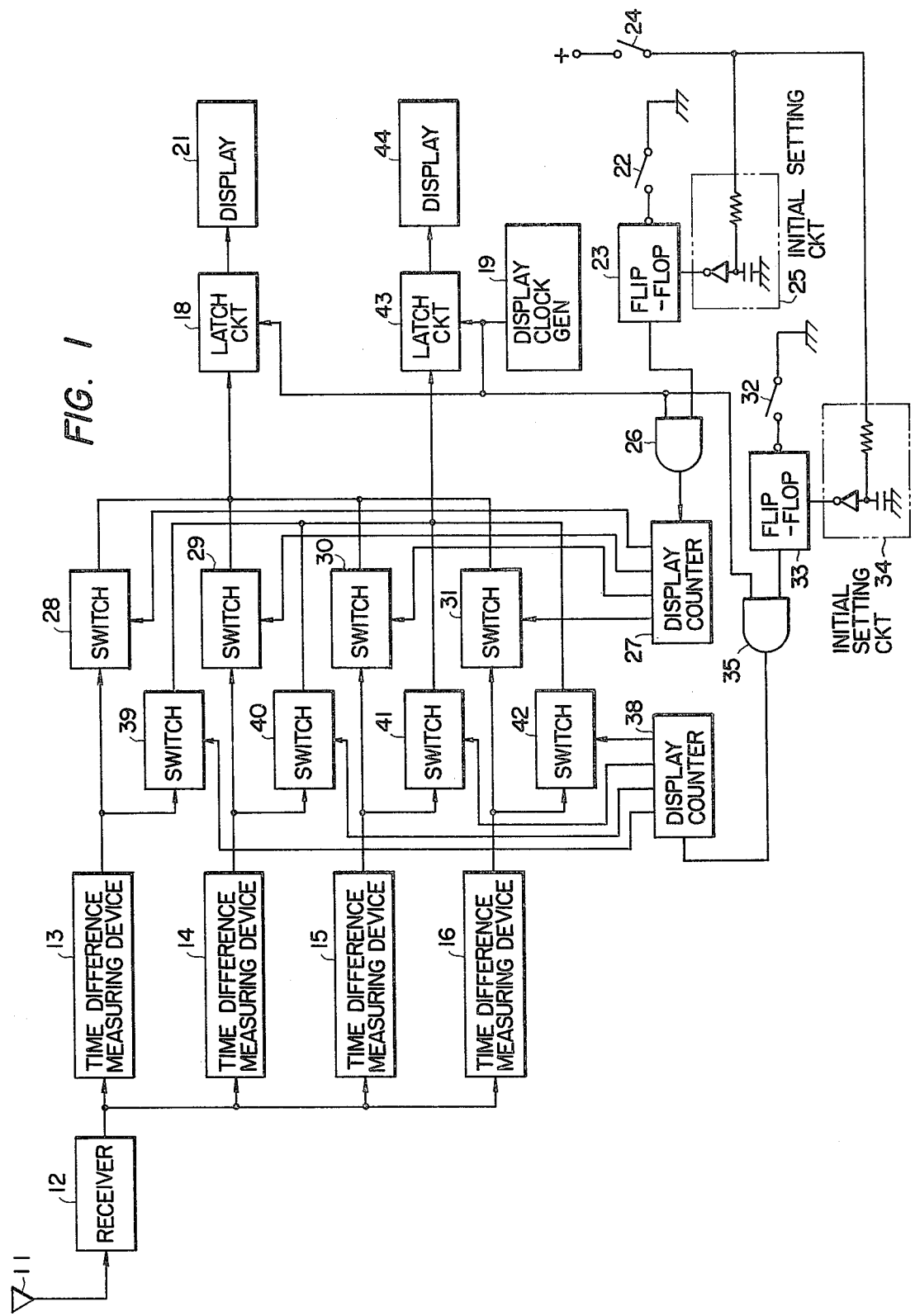
FIG. 1 is a block diagram illustrating an embodiment of the Loran receiver according to this invention.

Referring now to FIG. 1, an electric wave received at an antenna 11 is detected and amplified by a receiver 12 and applied to, for example, four time difference measuring devices 13 through 16 which are provided respectively for corresponding slave stations, each of which slave stations cooperates with a master station. In the time difference measuring devices 13 through 16, there are measured the time differences between a Loran signal from the master station and Loran signals from the four slave stations, respectively. The general construction of the Loran receiver is set forth, for example, in U.S. Pat. No. 3,868,691 issued Feb. 25, 1975.

According to this invention, there is provided display mode switching means, which is shown to be a push-button switch 22 in the illustrated embodiment. Upon each activation of the push-button switch 22, the output from a flip-flop 23 connected to the switch 22 is inverted. Turning ON a power source switch 24 results in an initial setting circuit 25 being connected to the flip-flop 23 so that its output becomes high in level. When the output from the flip-flop 23 is high-level, a gate 26 is opened by the high-level output, through which gate a clock is supplied from a display clock generator 19 to a display counter 27 and counted.

The display counter 27 has four output terminals, and upon each counting of one clock, the output terminal at which the counter output is derived is changed over to another. The outputs from the four output terminals turn ON corresponding switches 28 through 31 respectively. The outputs from the time difference measuring devices 13 through 16 are provided to a latch circuit 18 via the switches 28 through 31, respectively. The latch circuit 18 receives the clock from the display clock generator 19 and, upon each reception of the clock, latches the input and supplies the latched content to a display 21. Accordingly, in the latch circuit 18, the measured values from the time difference measuring devices 13 through 16 are latched in a sequential order, and on the display 21, the time differences between incoming Loran signals from the master and slave stations are displayed one after another. This is a first display mode. By a suitable selection of the display switching time, it is possible to read the displayed time differences between the incoming Loran signals from the master station and the respective slave stations.

Upon again depressing the switch 22 when the time difference suitable for measurement is displayed, the output from the flip-flop 23 is inverted to be low-level. As a consequence, the gate 26 is closed to stop the counting operation of the counter 27, the counter 27 retains the count value at that time, and the switching operation of the switches 28 through 31 is stopped. Only that one of the switches 28 through 31 which is supplied with the high level output from one of the output terminals of the counter 27 is held in the ON state, and the output from the time difference measuring device connected to the above said switch is periodically applied by the display clock generator 19 to the latch circuit 18 and displayed on the display 21. This is a second display mode.

The present embodiment is designed for displaying two time differences at the same time. To this end, another display mode changeover push-button switch 32 is added for controlling flip-flop 33, and another initial setting circuit 34 is added by which the output from the flip-flop 33 is automatically made high-level upon turning ON power source switch 24. The output from the flip-flop 33 controls a gate 35, and if the gate 35 is open, the clock from the display clock generator 19 is applied via the gate 35 to a display counter 38. By four outputs from the counter 38, switches 39 through 42 are respectively controlled to pass on the outputs from the time difference measuring devices 13 through 16 to a latch circuit 43. The latch circuit 43 latches the output from the time difference measuring device connected to that one of the switches 39 through 42 which is held in the ON state by the output derived from the counter 38 at that time, and the latched content of the latch circuit 43 is displayed on a display 44.

By the control of the switch 32, the measured values from the time difference measuring device 13 through 16 are displayed on the display 44 in a repeating cyclic order, or only a suitable one of the outputs from the time difference measuring devices 13 through 16 is continuously displayed on the display 44.

For instance, as shown in FIG. 2, display screens 21a and 44a on the displays 21 and 44 are disposed side by side on the front panel of the Loran receiver. The mode changeover switches 22 and 32 are provided in close proximity to the display screens 21a and 44a correspondingly thereto, respectively. By use of switches 22 and 32 it is possible to periodically displaying on the displays 21 and 44 the time differences between the pulse signals from the master station and the slave stations first, and then to display on said displays 21 and 44 two selected ones of the time differences which are suitable for measurement, thereby to effect a fix. Further, in the case where two time differences are displayed simultaneously and electric waves are received from three or more slave stations, not only the time differences between the pulse signals from the master station and two slave stations but also the time difference between the pulse signals from the master station and another slave station are displayed on occasion demands, by which the position measured by the two time differences can be confirmed by combining them with another time difference.

A knob 45 disposed on the front panel of the Loran receiver has three set positions $S_1$, M and $S_2$, and at the position $S_1$, the signal from the slave station utilized for the display on the display screen 21a can be controlled, for instance, by an advance control switch 46 or a delay control switch 47 to advance or delay. When the knob 45 is set at M, the signal from the master station can be similarly controlled by the switches 46 and 47. In the case of the knob 45 being set at the position $S_2$, the signal from the slave station used for the display on the display screen 44a can be likewise controlled. Further, the Loran pair being utilized at any time is selected by selecting means 48. A knob 49 is provided for the power source switch 24.

As described above, according to the Loran receiver shown in FIG. 1, in the first display mode, the time differences between Loran signals from the master station and each of the slave stations are automatically displayed in a repeating cyclic order, so that there is no need of switching the display of the time difference by manual operation for each slave station; therefore, it is easy to select the time difference suitable for the localization. Since the display mode switching is achieved by the actuation of the display mode changeover switch 22 or 32, a proper pair of master and slave stations can be easily selected. The display mode switching is not limited specifically to the operation of inverting the state of a flip-flop upon each depression of a push-button switch, as described previously, but may also be adapted to be effected merely by throwing the changeover switch in the direction of the first or second display mode.

While in the above embodiment its respective parts are formed with hardware they can also be arranged to operate by program control. That is, by successively reading out a control program to interpret and execute it, it is read in whether the switch 22 is controlled or not, and when it is controlled, the state of a display mode flag is inverted; namely, when the display mode flag is "0" indicative of the first display mode, it is altered to "1" indicative of the second display mode, and vice versa. If the display mode flag is "0," the outputs from the time difference measuring devices 13 through 16 are periodically read in one after another and supplied to a display buffer, i.e. the latch circuit 18, and upon reading each time difference, 1 is added to the content of one area of a memory corresponding to the counter 27. When the memory content becomes equal to the number "4" of the time difference measuring devices 13 through 16, the memory is reset. The display clock generator 19 can also be dispensed with because a clock in a microcomputer can be used as the display clock. Further, in the case of successively displaying the measured time differences from the time difference measuring devices 13 through 16 in the first display mode, it is also possible to display them in an increasing order by making use of the operating function of the microcomputer. Moreover, the function of the time difference measuring devices 13 through 16 can be performed partly or largely by the microcomputer.

Figure 3:
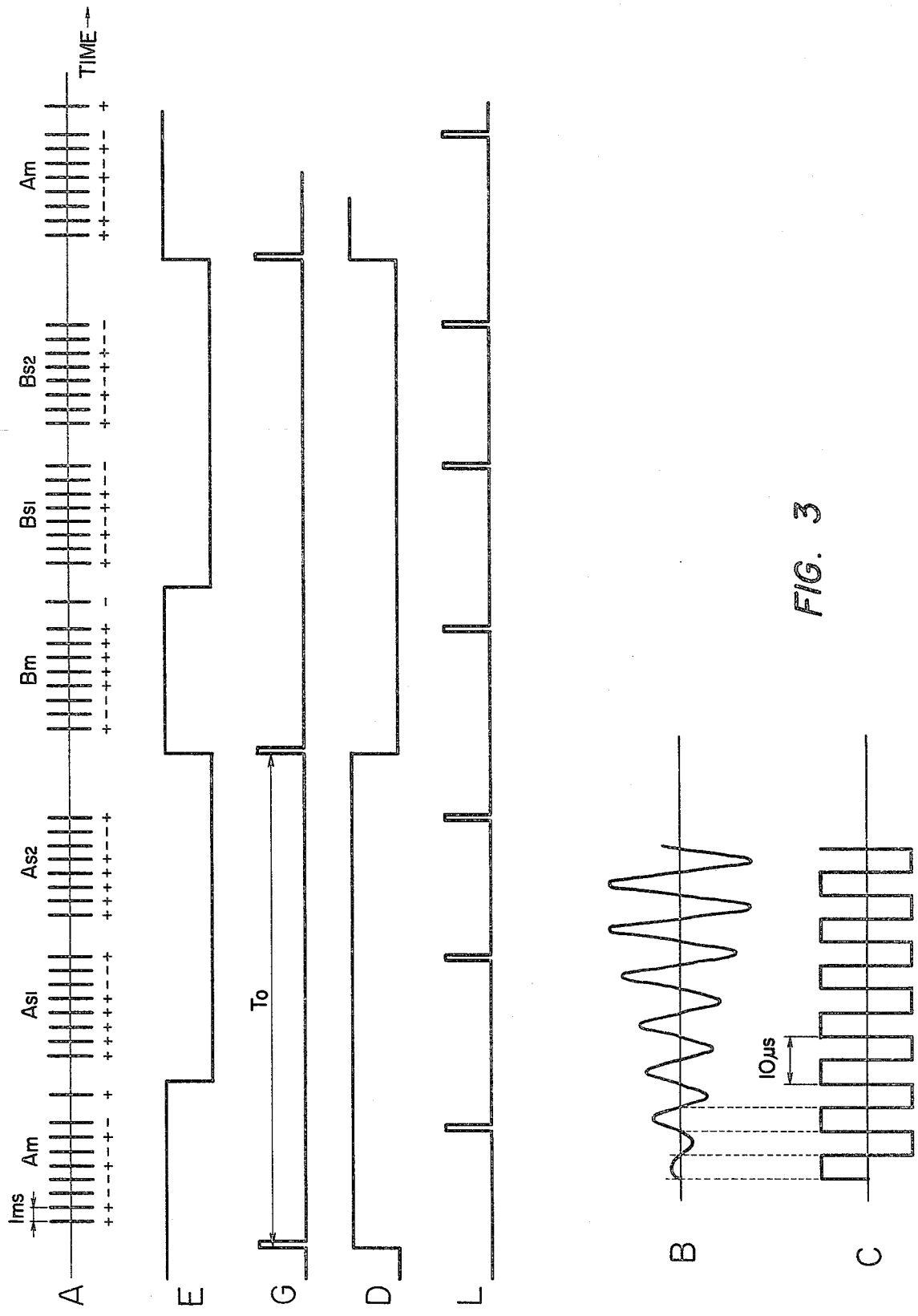
FIG. 3 is a series of waveforms explanatory of electric waves of Loran C and the operation of this invention.

In the case of a Loran C signal, as shown in FIG. 3A, a pulse group Am from the master station and then, for example, two pulse groups $As_1$ and $As_2$ from at least two slave stations are received, and then a pulse group Bm from the master station and pulse repetition groups from slave stations following it, corresponding to the next period, are received in succession. The Loran pulse groups are each composed of eight pulses spaced 1 ms apart. In order to distinguish the pulse group of the master station from those of the slave stations, a ninth pulse is added to the last of the eight pulses after an interval of 20 ms. To distinguish the pulse group of each station from those of the others, a code based on the combination of the carrier phases of the respective pulses is added. That is, as indicated by + and − directly below the pulses in FIG. 3A, the carrier of each pulse assumes either a + phase or − phase opposite therefrom; namely carrier phase of each pulse of the master and slave stations and those of the next repetition period is coded. This phase code enables the detection of the presence of the Loran signal.

In the Loran receiver of FIG. 1, for example as illustrated in FIG. 4, an electric wave received by antenna 11 is subjected to high-frequency amplification by a receiving amplifier 51 (12 in FIG. 1), and the amplified output is provided to a waveform shaping circuit 52, comprising a portion of the time difference measuring device 13 (see FIG. 1), in which each carrier is shaped into a square wave. The square wave output derived from the waveform shaping circuit 52 is applied to a signal detector 53 for the detection of a correct Loran signal. The detected output controls a frequency divider 55 which frequency divides a clock from a reference clock generator 54 to produce a measured pulse coincident with the correct Loran signal. The measured pulse thus obtained is provided to a sequencer 56 in which it is made coincident with a particular carrier cycle in the Loran pulse of that station in the output from the receiving amplifier 51 which has transmitted the detected Loran signal. In a likewise manner, another measured pulse similarly derived from the frequency divider 55 in connection with another Loran signal is applied to a sequencer 57 in which the measured pulse is made coincident with a particular carrier cycle in the Loran pulse of that station in the output from the receiving amplifier 51 which has transmitted the above said another Loran signal. The time difference between the output measured pulses from the sequencers 56 and 57 is measured by a difference measuring circuit 58, whose output is derived from one of the time difference measuring devices 13 through 16 in FIG. 1. In other words, though not shown in FIG. 4, sequencers similar to 56 and 57 are provided corresponding to the other slave stations, thereby forming all of the time difference measuring devices 13 through 16 shown in FIG. 1.

Figure 5:
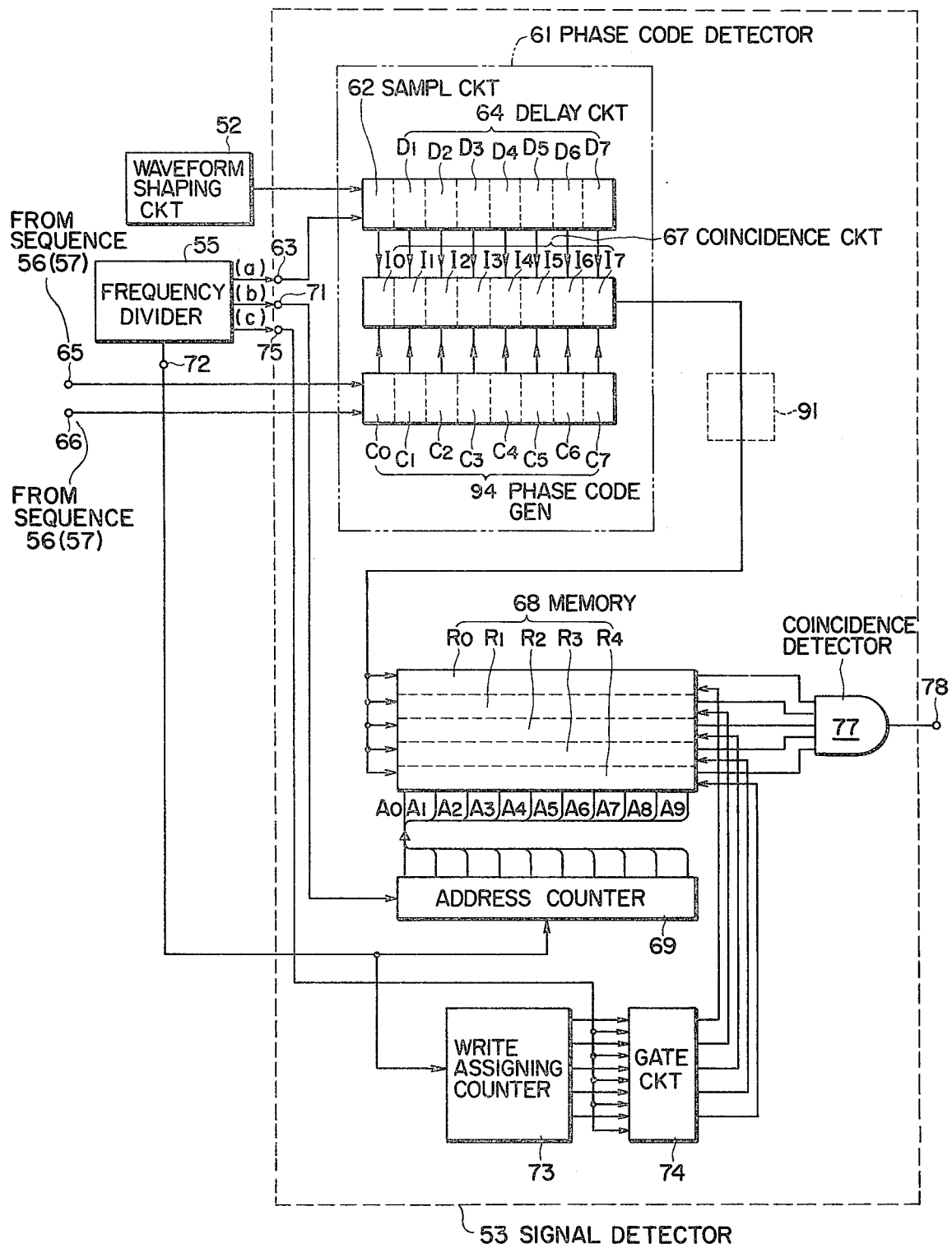
FIG. 5 is a block diagram illustrating an example of a signal detector 53 which forms the principal part of the Loran receiver circuit of FIG. 4.

The signal detector 53 is constructed, as illustrated in FIG. 5, for example. That is, the output from the waveform shaping circuit 52 is applied to a phase code detector 61, which is to detect a Loran signal of a desired phase code. In the waveform shaping circuit 52, one of the Loran pulses shown in FIG. 3B is rendered into such a square wave for each carrier cycle as shown in FIG. 3C, and the output from the waveform shaping circuit 52 is provided to a sample circuit 62 of the phase code detector 61 in which it is sampled by a sample pulse from a terminal 63 of the frequency divider 55. The sampled output is provided to a delay circuit 64 composed of cascade-connected delay elements $D_1$ through $D_7$. The delay elements $D_1$ through $D_7$ each delay the Loran pulse period by 1 ms. In the present embodiment, these delay elements $D_1$ through $D_7$ are formed with shift registers. The shift registers $D_1$ through $D_7$ are each composed of M bits. Letting Tap represent the period of the sample pulse from the terminal 63, the bit number M of each stage of the shift registers is so selected as to establish the relationship $M \times Tap = 1$ ms. A phase code generator 94 is provided, and in accordance with control signals supplied by sequencers 56 and 57 (FIG. 4) at terminals 65 and 66, a reference phase code is produced. To the terminal 65 is applied a control signal such as shown in FIG. 3D which has a pulse width corresponding to the repetition period $T_0$ of the Loran signal and has a period of $2T_0$. By this control signal, the pulse group A (Am, $As_1$, $As_2$) and the pulse group B (Bm, $Bs_1$, $Bs_2$) in the Loran signal are selected. To the terminal 66 is applied a control signal such as shown in FIG. 3E whose pulse width is substantially equal to the period of one Loran signal and whose period is equal to the repetition period $T_0$ of the Loran signal. By this control signal, the master station (Am, Bm) and the slave stations ($As_1$, $As_2$, $Bs_1$, $Bs_2$) are selected. Thus, the reference phase code for one Loran signal of one station is selected by the two control signals.

Turning back to FIG. 3, a description will be given of the case of selecting the Loran signal Am of the group A from the master station. The sample circuit 62 provides a positive or negative output depending upon the carrier phase of the Loran signal. When the first pulse of the Loran signal Am is derived from the delay element $D_7$, the sample circuit 62 provides the eighth pulse.

On the other hand, outputs $C_0$ through $C_7$ from the phase code generator 94 are $-, +, -, +, -, -, +, +$ under the control of the control signals supplied to the terminals 65 and 66. These outputs and the outputs from the sample circuit 62 and the delay elements $D_1$ through $D_7$ are respectively compared by a coincidence circuit 67, which provides a phase code detection output signal when the outputs compared are all coincident at the same time. In the case of achieving the control by the use of a microcomputer, various prestored reference phase codes are supplied to the coincidence circuit 67 in a predetermined order under the control of the microcomputer.

Upon switching the control signals at the terminals 65 and 66 in synchronization with the Loran signals $As_1$, $As_2$, Bm, $Bs_1$ and $Bs_2$, the phase code detection output signal is obtained for each Loran signal and this output signal assumes a waveform such as shown in FIG. 3L, from which the presence of the Loran C pulse can be detected.

The output from the phase code detector 61 is stored in a memory 68 comprised of N memory parts $R_0$ through $R_{N-1}$. The memory 68 stores the phase code detector output for N periods, each corresponding to one Loran pulse repetition period $T_0$. In the present embodiment, N=5, and five memory parts $R_0$ through $R_4$ are used, which are random access memories. An address counter 69 for addressing the memory parts $R_0$ through $R_4$ is provided in common to them. The address counter 69 counts clocks from a terminal 71 of the frequency divider 55 and, for each clock provides addresses $A_0$ through $A_4$ to the memory parts $R_0$ through $R_4$. The address counter 69 is reset by the pulse (FIG. 3G) of the Loran pulse repetition period $T_0$ from a terminal 72 of the frequency divider 55 to assign an address to each of the memory parts $R_0$ through $R_4$, permitting the writing of data into a given address or the reading out therefrom of stored data. Thus, data is written in one of the memory parts $R_0$ through $R_4$ and stored data is read out from the others and every Loran pulse repetition period, the memory part in which data is written is changed over to another in a sequential order. To perform this, the pulse of the period $T_0$ from the terminal 72 is also applied to a write assigning counter 73. The counter 73 is an N-step counter, in this embodiment 5-step, and derives its high-level output at five output terminals which are changed over every period $T_0$ in a sequential order. The output terminals of the counter 73 are each connected to one of the inputs of a gate circuit 74, and a terminal 75 of the frequency divider 55 is connected to another input of the gate circuit 74. Five outputs from the gate circuit 74 are supplied to read/write terminals of the memory parts $R_0$ through $R_4$. Consequently, write instructions for the memory parts $R_0$ through $R_4$ are provided while being switched in a sequential order of $R_0$ to $R_4$ every Loran pulse repetition period $T_0$.

For example, if the memory part $R_0$ is in its data write operation, the other memory parts $R_1$ through $R_4$ perform their data readout operation, and from the output side of the memory part $R_0$, the input thereto is derived as it is. After the elapse of the Loran repetition period $T_0$, the memory part $R_1$ is altered to its data write operation, whereas the memory parts $R_1$ and $R_2$ through $R_4$ perform their data readout operation. In this manner, data is written in each memory part once every five repetition periods, i.e. $5T_0$.

At least $5T_0$ after the starting of the receiver, the stored contents of memory parts $R_0$ to $R_4$ are such as, for example, shown in FIGS. 6A to E. In this example, each memory part has 1024 bits, that is, addresses 0 to 1023, and the period of the clock from the terminal 71 is 100 μsec., so that the output state of the phase code detector 61 is written in the memory 68 every 100 μsec. As a result of this, the phase code detection output corresponding to the signal Am from the master station is stored in the address $A_{160}$ of each of the memory parts $R_0$ through $R_4$, and the phase code detector outputs corresponding to the signals $As_1$ and $As_2$ from the slave stations are stored in the addresses $A_{454}$ and $A_{675}$ of each memory part, respectively. The high-level components of the other phase code detector outputs are all noises or pseudo-Loran signals and stored in the memory parts $R_0$ through $R_4$ at different addresses and do not coincide.

Figure 6:
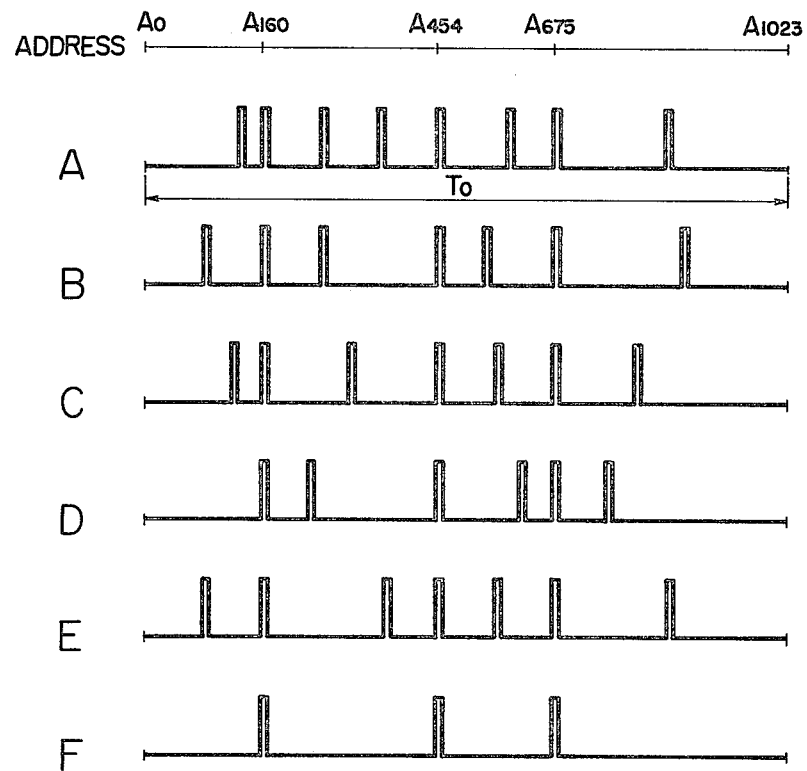
FIG. 6 is a series of waveforms showing examples of the storing states of memory parts $R_0$ through $R_4$ and an example of a coincidence output.

The outputs from the memory parts $R_0$ through $R_4$ are supplied to a coincidence detector 77, which derives an output at its output terminal 78 only when all the outputs from the memory parts $R_0$ through $R_4$ are obtained at the same time. The output waveform available at the output terminal 78 is only such as shown in FIG. 6F which agrees with the master station signal Am and the slave station signals $As_1$ and $As_2$.

Thus, even if an appreciable number of pseudo-Loran signals exist in the repetition period $T_0$, it is ensured to detect Loran signals from the master and the slave stations. The processing is done in five Loran repetition periods, i.e. $5T_0$. In the existing Loran C, the repetition period $T_0$ is 0.1 sec. at the longest, so that if N=5, the Loran signal can be detected. This is a markedly shorter time than in the prior art, which may require about 1 minute or longer in some cases.

Figure 7:
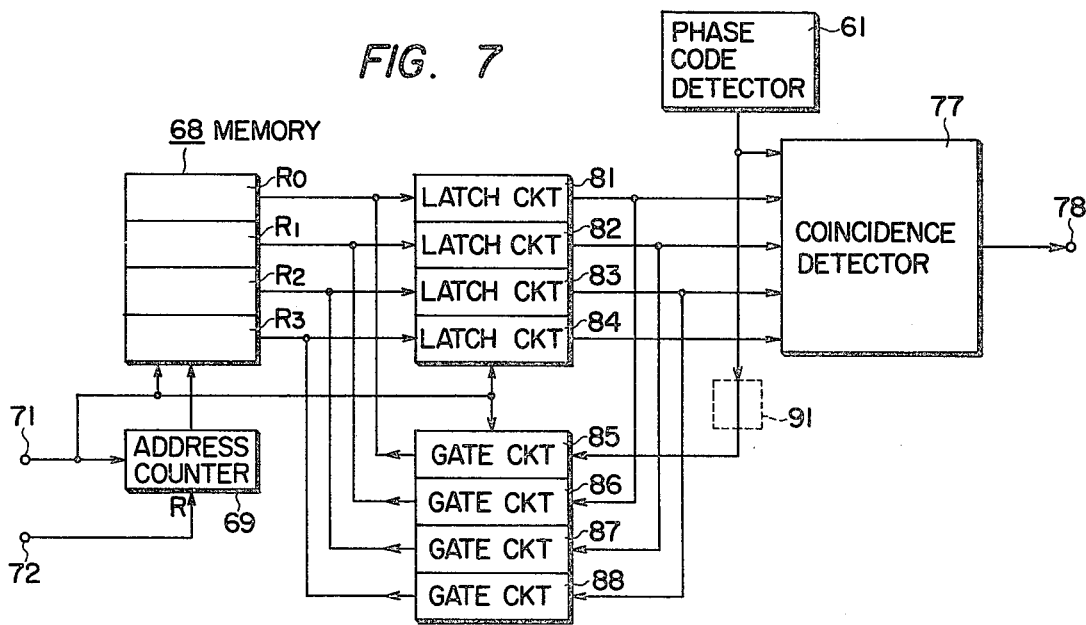
FIG. 7 is a block diagram illustrating another example of the signal detector 53.

Turning next to FIG. 7, a description will be given of another example in which the terminals of the memory 68 are adapted for both input and output. In the first half of each period of the clock supplied via the terminal 72 to the address counter 69, memory parts $R_0$ through $R_3$ are put in their read operation, and the content of each address assigned by the address counter 69 is read out from each of the memory parts $R_0$ through $R_3$ and latched in latch circuits 81 through 84. The output from the latch circuits 81 through 84 and the output from the phase code detector 61 are checked by the coincidence detector 77 as to whether or not they are coincident with each other.

The output from the phase code detector 61 is applied to a gate circuit 85 and the outputs from the latch circuits 81 through 83 are respectively supplied to gate circuits 86 through 88. In the second half of each period of the clock from the terminal 72, the memory parts $R_0$ through $R_3$ are put in their write operation, and data is written in each of the memory parts $R_0$ through $R_3$ at the address assigned by the address counter 69.

Accordingly, the output from the phase code detector 61 is always written in the memory part $R_0$, the output read out from the memory part $R_0$ is written in the memory part $R_1$, and the outputs read out from the memory parts $R_1$ and $R_2$ are written in the memory parts $R_2$ and $R_3$, respectively. The stored contents of the memory parts $R_0$ through $R_2$ are respectively transferred to the memory parts $R_1$ through $R_3$ every repetition period $T_0$.

In FIGS. 5 and 7, coincidence of all the outputs from the memory parts is detected, but it is also possible to arrange the gate circuits so that the signal being processed is regarded as a correct Loran signal when coincidence of more than a predetermined number of outputs (smaller than N) among those from the N memory parts is detected. The number of stages N of the memory parts of the memory 68 may preferably be 5 to 8 from the practical point of view. The memory 68 has been described to be a random access memory, but needless to say that the same results as those in the above can also be obtained with a shift register. Further, in the event that the sample pulse at the terminal 63 of the frequency divider 55 and the clock at the terminal 71 do not have a one-to-one correspondence with each other, a pulse expansion circuit 91 is inserted in the output side of the phase code detector 61, as indicated by the broken line in FIG. 5. The pulse expansion circuit 91 can be easily formed with, for example, a shift register of several bits and an OR gate. In the example of FIG. 7, if it is arranged so that only the output supplied to the gate circuit 85 is applied to the pulse expansion circuit 91, the output from the coincidence detector 77 becomes a pulse having the same narrow width as the output from the phase code detector 61.

As described above, the embodiments shown in FIGS. 5 and 7 ensure a rapid detection of Loran signals and is of great utility in practical use. Although this invention has been described as being applied to Loran C, the invention is also applicable to Loran D.

It will be apparent that many modifications and variations may be effected without departing from the scope of the novel concepts of this invention.

What is claimed is:

1. A Loran receiving apparatus comprising:
a Loran receiver for measuring the time differences between a Loran signal from a master station and Loran signals from a plurality of slave stations and providing the measured time differences as time difference signals at individual measured output terminals;
display mode changeover means manually controlled to set first and second display modes alternately with each other;
a display for providing a display of each time difference signal supplied thereto;
means for supplying the time difference signals at the measured output terminals to said display in a repeating cyclic order when the display mode changeover means is set in the first display mode; and
means for continuously supplying to said display that one of the time difference signals which is supplied to said display in the first display mode immediately before the first display mode is switched to the second one when said display mode changeover means is set in the second display mode.

2. A Loran receiving apparatus according to claim 1, wherein said display mode changeover means is a single switch.

3. A Loran receiving apparatus according to claim 2, wherein said display mode changeover switch is disposed in close and side-by-side relation to a display screen of said display.

4. A Loran receiving apparatus according to claim 3, wherein there are provided another display mode changeover switch and another display in close proximity to each other and in side-by-side relation to said display mode changeover switch and said display, respectively, and wherein there are provided means for supplying the time difference signals at the measured output terminals to said another display when said another display mode changeover switch is set in the first display mode, and means for supplying to said another display that one of the time difference signals which is supplied to said another display in the first display mode immediately before the first display mode is switched to the second one when said another mode changeover switch is set in the second display mode.

5. A Loran receiving apparatus according to claim 1 wherein said means for supplying the time difference signals comprises means operative in said first display mode for supplying the time difference signals to said display in an increasing order.

6. A Loran receiving apparatus according to claim 1, wherein the Loran receiver includes a receiving amplifier for receiving and amplifying a Loran wave, a waveform shaping circuit for waveform shaping the amplified output to a square wave for each carrier cycle of the amplified output, a phase code detector supplied with the waveform-shaped output to detect coincidence of its phase code with a reference phase code, a memory composed of N (N being an integer larger than 1) memory parts and supplied with the detected output to store it substantially in succession using the Loran signal repetition period as the unit for the storage, and a coincidence detector for detecting, as the presence of a correct Loran signal, coincidence of the stored contents of said memory parts for a corresponding time in the storage unit.

7. A Loran receiving apparatus comprising:
a receiving amplifier for receiving and amplifying a Loran wave;
a waveform shaping circuit for waveform shaping the amplified output to a square wave for each carrier cycle of the amplified output;
a phase code detector supplied with the waveform-shaped output to detect coincidence of its phase code with a reference phase code;
a memory composed of N (N being an integer larger than 1) memory parts and supplied with the detected output to store it substantially in succession, using the Loran signal repetition period as the unit for the storage; and
a coincidence detector for detecting, as the presence of a correct Loran signal, coincidence of the stored contents of said memory parts for a corresponding time in the storage unit.

8. A Loran receiving apparatus according to claim 7, wherein said phase code detector comprises a delay circuit composed of cascade-connected delay elements, each having a delay time equal to the pulse interval of a plurality of Loran pulses forming one Loran signal, the number of the delay elements being smaller than the plurality of Loran pulses by one, and a coincidence circuit for detecting coincidence of the combined state of the outputs from said delay elements with the reference phase code.

9. A Loran receiving apparatus according to claim 8, wherein said delay elements are each formed with a shift register shifted by a clock having a period sufficiently shorter than the pulse interval of the Loran signal, wherein said N memory parts are each formed with a random access memory, and wherein an address counter is provided in common to said N memory parts for addressing them, said address counter being reset by the Loran signal repetition period to count clocks synchronized with shift clocks from said delay elements.

10. A Loran receiving apparatus according to claim 7, wherein said N memory parts are each formed with a random access memory, wherein there is provided an address counter in common to said N memory parts for addressing them, and wherein said address counter is reset by the Loran signal repetition period to count a clock having a period sufficiently shorter than the repetition period.

11. A Loran receiving apparatus according to claim 10, wherein said N memory parts individually have input and output terminals, wherein there is provided a read/write control unit for sequentially shifting the write operation of said memory from one of said N memory parts to the other memory parts in synchronization with resetting of said address counter while at the same time holding all the remaining N−1 memory parts in their read operation, and wherein said coincidence detector is composed of AND gates supplied with the outputs from said N memory parts.

12. A Loran receiving apparatus according to claim 10, wherein said N memory parts respectively have input/output terminals, wherein there are provided a read/write control unit for putting said N memory parts in their readout and write operations in the first and the second half of the cycle of each clock of said address counter respectively; latch circuits for latching the outputs read out from said N memory parts respectively; and gate circuits opened during the write operation to supply the output from said phase code detector to a predetermined one of the N memory parts and the outputs from said latch circuits to the memory parts sequentially shifted by one from the read out memory part toward said predetermined memory part, and wherein said coincidence detector is composed of an AND gate supplied with the output from each of said latch circuits and the phase code detected output.

13. A Loran receiving apparatus according to claim 7, further including a pulse width expansion circuit for expanding the pulse width of the output from said phase code detector for input to said memory.

* * * * *